US010966307B2

(12) United States Patent
Woywode et al.

(10) Patent No.: US 10,966,307 B2
(45) Date of Patent: Mar. 30, 2021

(54) X-RAY SOURCE ARRANGEMENT FOR GENERATING X-RAY RADIATION

(71) Applicant: KONINKLIJKE PHILIPS N.V., Eindhoven (NL)

(72) Inventors: Oliver Woywode, Hamburg (DE); Tobias Barth, Dresden (DE); Albrecht Gensior, Dresden (DE); Jens Weber, Dresden (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/479,231

(22) PCT Filed: Jan. 19, 2018

(86) PCT No.: PCT/EP2018/051291
§ 371 (c)(1),
(2) Date: Jul. 19, 2019

(87) PCT Pub. No.: WO2018/134347
PCT Pub. Date: Jul. 26, 2018

(65) Prior Publication Data
US 2019/0387602 A1   Dec. 19, 2019

(30) Foreign Application Priority Data

Jan. 19, 2017 (EP) .................... 17152132

(51) Int. Cl.
*G01N 23/04* (2018.01)
*H05G 1/32* (2006.01)
(Continued)

(52) U.S. Cl.
CPC ............. *H05G 1/32* (2013.01); *H01J 35/025* (2013.01); *H05G 1/10* (2013.01); *H05G 1/22* (2013.01)

(58) Field of Classification Search
CPC .... H05G 1/32; H05G 1/22; H05G 1/10; H01J 36/025; H01J 35/025
See application file for complete search history.

(56) References Cited

U.S. PATENT DOCUMENTS

| 7,448,802 B2 * | 11/2008 | Oettinger | ................. H05G 1/10 378/203 |
| 2004/0125624 A1 | 7/2004 | Scheel | |

(Continued)

FOREIGN PATENT DOCUMENTS

CN   103414345 B   11/2015

OTHER PUBLICATIONS

PCT International Search Report, International application No. PCT/EP2018/051291, dated May 17, 2018.
(Continued)

*Primary Examiner* — Kiho Kim
(74) *Attorney, Agent, or Firm* — Larry Liberchuk (57) ABSTRACT

An X-ray source arrangement (10) for generating X-ray radiation (102), a method for operating the X-ray source arrangement (10), and an X-ray imaging apparatus (100) are provided. The X-ray source arrangement (10) comprises an X-ray tube (22), a converter arrangement (16) with an inverter (18) and a resonant converter (20) for providing a source voltage to the X-ray tube (22), a pre-controller (12), and a modulator (14). The pre-controller (12) is configured for determining a reference duty ratio (r, 26) of the resonant converter (20) as a continuous function of time based on a mathematical model of the resonant converter (20), and for providing a control signal (13) correlating with the reference duty ratio (r, 26) to the modulator (14). The modulator (14) is configured for determining a switching signal (15) based on the control signal (13), and for providing the switching
(Continued)

signal (15) to the inverter (18) of the converter arrangement (16) for actuating the inverter (18).

15 Claims, 4 Drawing Sheets (51) Int. Cl.
*H05G 1/22* (2006.01)
*H05G 1/10* (2006.01)
*H01J 35/02* (2006.01)

(56) References Cited

U.S. PATENT DOCUMENTS

| | | | |
|---|---|---|---|
| 2006/0098778 A1* | 5/2006 | Oettinger | H05G 1/06 378/101 |
| 2015/0063525 A1* | 3/2015 | Katcha | A61B 6/56 378/4 |
| 2015/0236600 A1 | 8/2015 | Waffler | |
| 2015/0380200 A1* | 12/2015 | Behling | H01J 35/24 378/124 |
| 2016/0021726 A1* | 1/2016 | Seo | H05G 1/20 378/104 |
| 2018/0063932 A1* | 3/2018 | Leibl | H02M 3/33569 |

OTHER PUBLICATIONS

Barth T. et al., "New Flatness-Based Control of a High-Voltage Generator for Medical X-Ray Applications", IET Digital Library, The Institute of Engineering and Technology, vol. 2018, Issue 11, Nov. 2018, p. 1799-1805.

* cited by examiner

X-RAY SOURCE ARRANGEMENT FOR GENERATING X-RAY RADIATION

FIELD OF THE INVENTION

Generally, the invention relates to the field of X-ray sources and/or X-ray generators for generating X-ray radiation.

Particularly, the invention relates to an X-ray source arrangement, to an X-ray imaging apparatus comprising such X-ray source arrangement, and to a method for operating an X-ray source arrangement.

BACKGROUND OF THE INVENTION

X-ray sources, X-ray source arrangements and/or X-ray generators usually comprise a converter with an inverter coupled to a resonant converter, also referred to as resonant tank, wherein the inverter may e.g. comprise a half-bridge and/or a full-bridge module for supplying electrical power to the resonant tank. By means of the converter, a certain output voltage and/or a certain output current may be supplied to an X-ray tube, such that X-ray radiation of a certain energy and/or intensity may be generated.

Particularly in the field of medical X-ray applications, X-ray sources are usually operated in a pulsed mode, in which pulses of X-ray radiation with a certain energy, intensity and/or frequency are generated. For this purpose, usually a modulation signal with slowly varying voltage is converted into a discrete switching signal by means of a modulator, which is then used to actuate the inverter of the X-ray source such that a desired voltage pulse is generated by the converter leading to a desired pulse of X-ray radiation emitted by the X-ray tube.

Further, a feedback loop may set and/or adjust the modulation signal by processing some measured variables and/or quantities of the X-ray source. By way of example, a measured output voltage may be compared to a desired reference output voltage. The feedback loop usually comprises a controller for compensating deviations of the measured output voltage from the desired reference output voltage, wherein the controller may have a proportional part and a significant integral part in order to generate an error signal indicative of the deviation. With this conventional approach it may be difficult to generate reproducible high-voltage pulses with the converter having a flat-top pulse shape, which may be desired in medical imaging applications.

SUMMARY OF THE INVENTION

There may therefore be a need for an improved, stable and reliably controllable X-ray source and/or X-ray source arrangement having an improved output characteristic.

This is achieved by the subject matter of the independent claims, wherein further embodiments are incorporated in the dependent claims and the following description.

According to a first aspect of the invention, an X-ray source arrangement for generating X-ray radiation is provided. The X-ray source arrangement comprises an X-ray tube, a converter arrangement for providing a source voltage to the X-ray tube, a pre-controller, and a modulator coupled to the converter arrangement and to the pre-controller. The converter arrangement comprises an inverter and a resonant converter. Therein, the pre-controller is configured for determining, calculating and/or computing a reference duty ratio of the resonant converter over a predetermined period of time based on a mathematical model of the resonant converter. Further, the pre-controller is configured for providing a control signal correlating with the reference duty ratio to the modulator, wherein the modulator is configured for determining a switching signal based on the control signal. Moreover, the modulator is configured for providing the switching signal to the inverter of the converter arrangement for actuating the inverter, such that the source voltage is generated by the converter arrangement. The converter arrangement may be configured for supplying and/or providing the source voltage to the X-ray tube, such that X-ray radiation is generated and/or emitted by the X-ray tube.

According to an example, the pre-controller may be configured to determine the reference duty ratio of the resonant converter as a continuous function of time over the predetermined period of time based on the mathematical model of the resonant converter. Alternatively or additionally, the pre-controller may be configured to determine a reference inductor current and/or a reference output voltage of the resonant converter as a continuous function of time over the predetermined period of time based on the mathematical model of the resonant converter. Therein, the continuous function of time may relate to a time-continuous function of the reference duty ratio, the reference inductor current and/or the reference output voltage. Accordingly, the pre-controller may be configured to determine the reference duty ratio, the reference inductor current and/or the reference output voltage as a time-continuous function over the predetermined period of time. The reference duty ratio, the reference inductor current and/or the reference output voltage may vary over time in the predetermined period of time. Further, the control signal may be indicative of and/or correlating with the reference duty ratio, the reference inductor current and/or the reference output voltage. The control signal may be fed forward to the modulator and/or the pre-controller may be configured to feed forward the control signal to the modulator. The term "pre-controller" may refer to a pre-control device, a pre-control circuitry, a trajectory planning device and/or a trajectory generator for determining, computing and/or calculating a trajectory in the state space, which the X-ray source arrangement should follow during operation in order to generate a desired pulse of source voltage and/or in order to generate a desired pulse of X-ray radiation. By way of example, features and/or functions of the pre-controller may be implemented in a Digital Signal Processor (DSP), a Field Programmable Gate Array (FPGA) and/or any other suitable logic element. Particularly, the pre-controller may be configured for determining a trajectory of the reference duty ratio taking into account any hardware limit of the X-ray source arrangement. Hence, the reference duty ratio may fall in the interval between zero and one and/or the reference duty ratio may range from zero to one. Alternatively or additionally, the reference duty ratio may range from minus one to plus one.

Therein, the reference duty ratio may be determined by the pre-controller as a function of time. Thus, the term "reference duty ratio over a predetermined time" may refer to a duty ratio determined, computed and/or calculated by the pre-controller as a continuous function of time over the predetermined period of time. Accordingly, a trajectory of the reference duty ratio may refer to the reference duty ratio as a function of time.

Further, the term "predetermined period of time" may refer to a time interval, in which the reference duty ratio is determined by the pre-controller. A length of this time interval may be automatically determined, set and/or adjusted by the pre-controller before the actual calculation of the reference duty ratio is done. Alternatively or additionally, the length of the time interval may be defined by other means, such as e.g. by an input of a user of the X-ray source arrangement.

Generally, the "mathematical model of the resonant converter" may refer to a model describing a state of the resonant converter by means of a functional relation between system variables of the resonant converter, such as e.g. an inductor current flowing in the resonant converter, an output voltage of the converter arrangement and/or the duty ratio, wherein the inductor current and/or the output voltage of the converter arrangement, which may be an output-capacitor voltage across a capacitor of the converter arrangement, may also be referred to as state variables of the resonant converter. Particularly, the mathematical model may be an averaged mathematical model describing characteristics of the X-ray source arrangement and/or the resonant converter, which may slowly vary in time, such as e.g. on a time-scale between 1.0 μs and 10 μs. Therein, the term "averaged mathematical model" may mean that at least a part of the system variables of the converter arrangement may be averaged over at least one (natural) resonance period of the resonant converter, particularly over at least two and/or at least three resonance periods. Also, at least a part of the system variables may be averaged over at least five to ten resonance periods. Therein, the term "averaging" and/or "averaged" may refer to amplitudes and/or the use of amplitudes of a Fourier series expansion of at least a part of the system variables in order to describe the slowly time varying component of the respective system variable.

The control signal may refer to a digital and/or continuous control signal describing and/or encoding the reference duty ratio over the predetermined period of time. This continuous and/or digital control signal may be converted by the modulator into the switching signal, wherein the switching signal may refer to a discrete switching signal.

Therein the term "modulator" may refer to a modulation device and/or a modulation circuitry configured for applying modulation techniques in order to generate the discrete switching signal based on the continuous control signal.

The inverter of the converter arrangement may comprise one or a plurality of half-bridge and/or full-bridge modules for supplying electrical power to the resonant converter, wherein the half-bridge and/or full-bridge modules may each comprise one or a plurality of semiconductor switches, which may be controlled and/or actuated by the switching signal. Thus, the switching signal itself or a gate signal correlating with the switching signal may be supplied to a gate terminal of at least one of the semiconductor switches of the inverter in order to actuate and/or switch the respective semiconductor switch.

Moreover, the resonant converter of the converter arrangement may refer to a resonant converter circuit, a resonant tank circuit and/or a tuned circuit comprising at least one inductor coil (L) connected in series to at least one capacitor (C). The resonant converter may thus refer to an electrical resonator and/or an LC-circuit storing electrical energy, which may oscillate between energy storage elements of the resonant converter, wherein the energy storage elements may be the at least one inductor coil (L) and the at least one capacitor (C).

Further, it is to be noted that the converter arrangement may be operated in a so-called quantum mode, in which the inverter of the converter arrangement is actuated and/or switched at a zero crossing of an inductor current flowing in the resonant converter. This in turn may enable soft switching resulting in low switching losses and less electromagnetic interference (EMI).

According to an embodiment, the pre-controller is configured for determining a reference inductor current of the resonant converter over the predetermined period of time based on the mathematical model of the resonant converter. Additionally or alternatively, the pre-controller is configured for determining a reference output voltage of the converter arrangement over the predetermined period of time based on the mathematical model of the resonant converter.

According to an embodiment, the pre-controller is configured for determining the reference duty ratio over the predetermined period of time based on the reference inductor current and/or based on the reference output voltage.

The term "reference" may indicate that the corresponding physical quantity, i.e. the duty ratio, the inductor current and/or the output voltage, is determined, computed and/or calculated by the pre-controller based on the mathematical model.

Further, it is to be noted, that the term "source voltage" referred to above and in the following may denote a voltage supplied via the converter arrangement to the X-ray tube. This source voltage may also be an actual output voltage and/or the output voltage of the converter arrangement, which is referred to as the "reference output voltage" when determined and/or calculated based on the mathematical model. Moreover, as explained in more detail in the following, the source voltage, the output voltage and/or the reference output voltage may be a so-called flat output of the converter arrangement.

The invention may be considered being based on the following findings and/or insights. Generally, so-called flatness may be a property of a linear and/or a non-linear dynamical system, wherein a dynamical system is called flat, if it possesses a so-called flat output. The flat output may or may not be a physical quantity of the dynamical system. All state variables and/or control inputs of a flat system may be expressed via the flat output using the flat output and/or time derivatives thereof. Accordingly, no integration may be required in the pre-controller to express the system variables and/or control inputs of such dynamical system. The non-linear dynamical system may be linearized via the flat output by either feedback or feedforward. This may allow for imposing a linear error dynamics onto the non-linear system. As a consequence, a linear controller may be used to guide such dynamical system along a pre-computed trajectory of any system variable of the system. In other words, a linear controller may stabilize the non-linear system along a planned and/or pre-computed trajectory, e.g. a trajectory of the reference duty ratio over the predetermined period of time, particularly from one equilibrium point or state to another equilibrium point or state of the non-linear system. Therein, the non-linear system may relate to the converter arrangement, the resonant converter and/or the X-ray source arrangement.

Based on the mathematical model of the resonant converter it has been found by the inventors of the present invention that the resonant converter and/or the converter arrangement of the X-ray source arrangement of the present invention may refer to such a dynamical system, which is flat and/or which possesses a flat output. Therein, the flat output of the converter arrangement may refer to an output voltage of the converter arrangement and/or to a reference output voltage as determined and/or calculated based on the mathematical model. The flat output of the converter arrangement may e.g. be the voltage across capacitor $C_A$ in FIG. 4, which may be the system's and/or converter arrangement's output voltage, and which may also be supplied as "source voltage" to the X-ray tube. Thus, by describing at least a part of the converter arrangement by means of the mathematical model, a behavior of the converter arrangement and/or a control of the converter arrangement may be significantly improved and/or simplified with respect to conventional X-ray sources and/or conventional X-ray source arrangements, as will be explained in more detail in the following.

As already mentioned above, a drawback of conventional X-ray sources and/or X-ray source arrangements may be that voltage pulses having a flat top, i.e. having a flat and/or substantially constant course at a nominal voltage value, are hard to obtain, particularly in a repeated manner. It is to be noted that the "flat top" refers to a shape of a voltage pulse generated by the converter arrangement, which is not be confused with the "flatness" of the converter arrangement and/or the resonant converter, which refers to a characteristic of the converter arrangement and/or the resonant converter as described in the mathematical model. Thus, it may be a challenge to reach a stable and repeatable flat-top pulse shape with a shortest rise time possible without over- and/or undershooting of the output voltage of the converter arrangement. This challenge may not be met by conventional control approaches and/or by conventional X-ray source arrangements. On one hand, the rise time may be too long, e.g. due to a slow integrator action of a controller, which may be used in a feedback loop of the conventional X-ray source arrangement. On the other hand, an overshoot of the output voltage may occur if the rise time is too aggressive. Apart from that, e.g. a linear controller employed in the feedback loop of conventional X-ray source arrangements may force the X-ray source arrangement onto trajectories that may not respect hardware limits of the X-ray source arrangement, such as e.g. a maximum voltage and/or a maximum current of the converter arrangement. As a consequence, the X-ray source arrangement may not be able to follow the trajectory suggested by the controller, e.g. due to hardware protection means, such as an over current protection device and/or actuator limitations, which may be triggered and thereby prevent the X-ray source arrangement to obey a respective control signal provided the controller. This in turn may require an anti wind-up scheme for the controller of such conventional X-ray source arrangement.

All these above-mentioned drawbacks of conventional X-ray source arrangements are overcome by the X-ray source arrangement according to the present invention. Particularly, by modelling the converter arrangement and/or the resonant converter of the X-ray source arrangement with the mathematical model, a desired trajectory, waveform and/or course of the reference inductor current and/or a resonant inductor current flowing in the resonant converter may be planned and/or determined based on the mathematical model. Therein, the reference inductor current may refer to a non-flat output of the converter arrangement. Further, the planned trajectory and/or course of the reference inductor current may respect any hardware limit of the X-ray source arrangement, including e.g. a maximum inductor current and/or the reference duty ratio falling in the interval between zero and one, which may also be considered during the planning process. As a consequence, no hardware protection means, such an over-current protection device and/or an anti-wind-up scheme, may be required for the inventive X-ray source arrangement. This in turn may simplify a design of the entire X-ray source arrangement and may allow to provide a cost-efficient X-ray source arrangement.

Moreover, the flat output of converter arrangement and/or of the resonant converter may refer to the reference output voltage of the converter arrangement and/or the resonant converter as determined based on the mathematical model. The relation between the flat and the non-flat output, i.e. the relation between the reference inductor current and the reference output voltage, may be described by an ordinary in-homogenous differential equation of first order with constant coefficients according to the mathematical model of the resonant converter. Due to the fact that there is an analytical closed-form solution to such kind of differential equations, if the trajectory for the non-flat output is determined, an appropriate trajectory for the flat output may be immediately determined based on the analytical solution of the differential equation and/or based on the mathematical model. In other words, if the reference inductor current of the resonant converter is determined, the reference output voltage may immediately be determined and/or calculated based on the mathematical model. This generally allows a comprehensive trajectory planning for system variables of the X-ray source arrangement during, including the inductor current, the output voltage and/or the duty ratio.

Apart from that, an appropriately planned trajectory for the inductor current may then result in a smooth trajectory for the reference output voltage that may reach a desired set-point value and/or a desired nominal voltage value without any overshoot and within the shortest possible rise time. Thus, this allows to improve the output characteristic of the converter arrangement as well as the output characteristic of the X-ray tube.

According to an embodiment, the pre-controller is configured for determining the reference duty ratio over the predetermined period of time based on a nominal voltage value of the X-ray tube and/or based on a nominal current value of the X-ray tube. The nominal voltage value and/or the nominal current value may be defined e.g. by a user of the X-ray source arrangement according to requirements of an X-ray application. Further, the nominal voltage value may refer to e.g. a desired maximum voltage value of voltage pulses generated by the converter arrangement and/or the nominal current value may refer to a maximum and/or steady state inductor current, which may be generated by the converter arrangement and supplied to the X-ray tube to generate X-ray radiation. Thus, by specifying the nominal voltage value an energy and/or energy distribution of the X-ray radiation may be specified. Further, by specifying the nominal current value an intensity of the X-ray radiation may be specified.

According to an embodiment, the resonant converter of the converter arrangement comprises a series-parallel resonant converter, also referred to as LCC converter. Alternatively or additionally, the mathematical model of the resonant converter comprises one inductor coil and four capacitors as energy storage elements of the resonant converter. Particularly, the converter arrangement may comprise the inverter serving as an input power source, the series-parallel resonant converter with a boost capacitor (e.g. capacitor $C_K$ coming in FIG. 4) connected in series to a resonant circuit (LC-circuit) comprising an inductor coil connected parallel to a capacitor, a diode rectifier, and a capacitive output filter. By way of example, the boost capacitor may refer to and/or be part of a voltage multiplier of the converter arrangement. Thus the boost capacitor may refer to and/or represent any voltage multiplication circuitry of the converter arrangement. Accordingly, the converter arrangement may comprise one inductor coil and four capacitors, which may serve as energy storage elements for storing electrical energy. All these components may be modelled and/or comprised in the mathematical model describing a state, state variables and/or system variables of the converter arrangement and/or the resonant converter.

According to an embodiment, the X-ray source arrangement further comprises a controller for compensating deviations of the source voltage from a reference output voltage of the converter arrangement and/or for compensating deviations from the reference duty ratio. The pre-controller is coupled to the controller and configured for providing a reference output voltage value to the controller, wherein the controller is configured for comparing the reference output voltage value to a measured value of the source voltage.

It is to be noted, that the term "source voltage" referred to above and in the following may denote a voltage supplied via the converter arrangement to the X-ray tube. This source voltage may also be an actual output voltage and/or the output voltage of the converter arrangement, which is referred to as the "reference output voltage" when determined and/or calculated based on the mathematical model. Moreover, as outlined above, the source voltage, the output voltage and/or the reference output voltage may be the flat output of the converter arrangement.

Further, the controller is configured for determining a feedback control signal indicative of and/or correlating with a deviation of the measured value of the source voltage from the reference output voltage value. The X-ray source arrangement may, thus, comprise a feedback loop with a voltage measuring device measuring the output voltage and for providing the measured output voltage value to the controller. The feedback loop may further comprise the controller, which may determine a deviation of the measured voltage value and the reference output voltage value provided by the pre-controller. By way of example, the controller may be configured for determining this deviation by subtracting the measured voltage value and the reference output voltage value. The controller may then determine the feedback control signal, which may be added to the control signal of the pre-controller correlating with the reference duty ratio. This added signal may then be supplied and/or provided to the modulator in order to determine and/or generate the switching signal for actuating the inverter. This may advantageously allow the converter arrangement to follow the reference duty ratio and to generate stable and well-defined voltage pulses with a flat top, which may be supplied to the X-ray tube. In turn, this may enable the X-ray source arrangement to generate stable and well-defined pulses of X-ray radiation. The controller may generally refer to a control device, a control unit, a control module, a regulator and/or a control circuitry. Further, the X-ray source arrangement of the present invention may advantageously be used in dual energy X-ray applications, e.g. employing kV-peak switching.

According to an embodiment, the controller is a linear controller, e.g. having a proportional part and a differential part. Alternatively or additionally the controller is configured for determining the feedback control signal based on solving an ordinary linear differential equation of first order. Therein, the phrase "based on solving the ordinary linear differential equation of first order" may mean that the controller is configured to synthesize and/or determine the feedback control signal.

Generally, by determining the reference duty ratio and/or by determining the switching signal based on the control signal correlating with the reference duty ratio, the X-ray source arrangement and/or the converter arrangement may be linearized by providing and/or feeding forward the control signal to the modulator. The linearized X-ray source arrangement and/or the linearized converter arrangement may then be controlled by a linear controller and/or a linear regulator, which may only have a proportional part and a differential part. In other words, by determining the reference duty ratio and providing the control signal correlating with the reference duty ratio, a linear controller may be used in the feedback loop of the X-ray source arrangement in order to guide the X-ray source arrangement during operation along the reference output voltage, as determined based on the mathematical model. Using a linear controller may simplify a design of the X-ray source arrangement and save production costs. Moreover, the linear controller may not need to integrate an error signal, such as e.g. an error signal based on the subtracted measured voltage value and the reference output voltage value. The missing integrator action may advantageously allow to provide the fastest controlled response of the X-ray source arrangement and renders anti wind-up measures and/or anti wind-up schemes obsolete, which may be required in conventional X-ray source arrangements. In other words, by determining the reference duty ratio and feeding the control signal correlating with the reference duty ratio forward to the modulator, the non-linear converter arrangement may obey a well-behaved linear error dynamics that converges asymptotically stable to zero with a time constant entirely appropriate for medical X-ray applications.

According to an embodiment, the controller is coupled to the modulator and configured for providing the feedback control signal to the modulator, wherein the modulator is configured for determining the switching signal based on the control signal of the pre-controller and based on the feedback control signal of the controller. As already mentioned above, the control signal and the feedback control signal may be added, and the switching signal may be determined based on this added signal in order to compensate deviations from the reference duty ratio.

According to an embodiment of the invention, the pre-controller is configured to determine, compute and/or calculate at least one of a first controller parameter and a second controller parameter based on the mathematical model of the resonant converter, wherein the at least one of the first controller parameter and the second controller parameter correlate with a coefficient of an ordinary linear differential equation for an error variable, which error variable correlates with a difference between the source voltage, e.g. a measured value of the source voltage, generated by the X-ray source arrangement and a reference output voltage value determined by the pre-controller based on the mathematical model. Accordingly, the pre-controller may be configured to determine a value of the first controller parameter and/or a value of the second controller parameter. Therein, one of the first controller parameter and second controller parameter may be fixed, while the pre-controller may determine the other one of the first controller parameter and second controller parameter. However, the pre-controller may also be configured to determine both the first controller parameter and the second controller parameter. Therein each of the first controller parameter and the second controller parameter may correlate and/or refer to a coefficient of the differential equation for the error variable.

As described above, by feeding forward the control signal correlating with the reference duty ratio over the predetermined period of time, the X-ray source arrangement and/or the converter arrangement may be linearized, so that an error variable and/or an error signal of the X-ray source arrangement may obey a well-defined linear error dynamics.

Therein, the error signal and/or the error variable may correlate with a deviation of the source voltage, e.g. a measured value of the source voltage, generated by the X-ray source arrangement and a reference output voltage value as determined by the pre-controller based on the mathematical model. The dynamics or behaviour of the error variable may then be described and/or governed by a second order ordinary linear homogenous differential equation with constant coefficients. In order to guide the X-ray source arrangement along the pre-computed reference duty ratio over the predetermined period of time, a linear controller may be used and/or employed, e.g. in a feedback loop, to determine and/or synthesize the feedback control signal comprising a derivative part or term and a proportional part or term of this second order linear differential equation. These terms hence relate to a first order ordinary linear differential equation from which the feedback control signal is synthesized and/or determined by the controller to guide the X-ray source arrangement along the reference duty ratio over the predetermined period of time. The first controller parameter may relate to and/or correlate with a coefficient of the derivative part, particularly the first derivative part, of the differential equation and the second controller parameter may relate to and/or correlate with the coefficient of the proportional part of the differential equation. Accordingly, the pre-controller may be configured to determine at least one of the coefficients of the differential equation that may be used by the controller to synthesize and/or determine the feedback control signal in order to guide the converter arrangement along the determined reference duty ratio over the predetermined period of time. This allows to significantly reduce any deviations of the source voltage generated by the X-ray source arrangement from the reference output voltage and/or the reference duty ratio as determined based on the mathematical model.

In conventional X-ray source arrangements usually a feedback loop sets a feedback control signal by processing measured variables, such as e.g. a measured source voltage. The feedback loop usually includes a controller with a significant integral term and a proportional term to achieve a certain control objective, e.g. to set a certain source voltage. In conventional X-ray source arrangements the coefficients and/or gains of the integral and the proportional term are usually fixed after they have been optimized for a certain state of the X-ray source arrangement, such as e.g. an equilibrium state and/or a state in which a constant source voltage is generated, and/or for a certain transition between two states of the converter arrangement, e.g. a transition between two equilibrium states. Such optimization procedure can be time-consuming, empirical and requires experience. Further, while the integral and proportional gains determined by such a hand-tuning method may be optimal for a specific state of the X-ray source arrangement, e.g. a specific equilibrium state, these parameters may be less optimal for a different state or for a different transition from one state to another state of the X-ray source arrangement. Moreover, the optimized parameters of the controller may depend on what the person who carried out the optimization considers as optimal. If the optimization is repeated by another person, different controller parameters and/or different controller parameter values may be determined. A repeatable and/or reproducible flat-top high-voltage pulse may, however, be required in medical imaging applications but may be hard to obtain using such a traditional control approach.

By computing the first and/or second controller parameters by means of the pre-controller, it may be ensured that the first and/or second controller parameters are appropriate and/or optimal for each specific reference duty ratio as determined over the predetermined period of time and/or for each control objective to be achieved by the pre-controller. As a consequence, the X-ray source arrangement may be smoothly guided along the pre-computed reference duty ratio without overshooting and/or in the shortest rise-time possible.

According to an embodiment of the invention, the pre-controller is configured to determine both the first controller parameter and the second controller parameter based on the mathematical model of the resonant converter.

According to an embodiment of the invention, the pre-controller is configured to calculate, e.g. based on the mathematical model, a transition time of the converter arrangement from a first state of the converter arrangement, in which a first reference output voltage is generated by the converter arrangement, and a second state of the converter arrangement, in which a second reference output voltage is generated by the converter arrangement, wherein the pre-controller is configured to determine the at least one of the first controller parameter and the second controller parameter based on the determined transition time. Generally, the first state and the second state may refer to arbitrary states of the converter arrangement. Particularly, the first state and the second state each may refer to an equilibrium state of the converter arrangement. By way of example, a control objective may be to generate at least a part of a voltage pulse starting from an initial voltage to a final voltage. The state in which the initial voltage is generated may refer to the first state and the state in which the final voltage is generated may refer to the second state of the converter arrangement. Accordingly, the transition time may denote the time required for the converter arrangement to change the source voltage and/or the output voltage from the initial to the final voltage value. By determining the first controller parameter and/or the second controller parameter based on the transition time, the first controller parameter and/or the second controller parameter may be chosen specifically for the transition from the first state to the second state such that the converter arrangement can be guided along the corresponding reference duty ratio determined for this transition. Accordingly, the predetermined period of time, over which the reference duty ratio is determined, may refer to and/or correlate with the transition time between the first state and the second state. Further, determining the first controller parameter and/or the second controller parameter based on the transition time, may particularly be advantageous for pulsed applications and/or for dual energy applications, e.g. employing kv-peak switching.

According to an embodiment of the invention, the pre-controller is configured to provide and/or feed forward the at least one of the first controller parameter and the second controller parameter to a controller of the X-ray source arrangement, wherein the controller is configured to determine a feedback control signal based on the at least one of the first controller parameter and the second controller parameter, the feedback control signal being indicative of a deviation of the source voltage from the reference output voltage value. As described above, a dynamics and/or behaviour of an error signal and/or an error variable may be governed by a second order homogenous linear differential equation. The error signal and/or the error variable may e.g. be given as the difference between a measured value of the source voltage and a reference output voltage value determined by the pre-controller. The controller may determine the derivative part and the proportional part of the differential equation. These two parts may accordingly refer to a first order linear differential equation from which the feedback control signal is synthesized and/or determined by the controller in order to minimize deviations of the measured source voltage from the reference voltage value. For this purpose, the controller may be configured to determine the error signal and/or the error variable as well as the first time derivative of the error variable. The pre-controller may provide the first controller parameter and/or the second controller parameter to the controller, wherein the first controller parameter may refer to and/or correlate with the coefficient of the derivative part of the differential equation and the second controller parameter may refer to and/or correlate with the coefficient of the proportional part of the differential equation. In other words, the controller may be configured to synthesize and/or determine the feedback control signal based on the error variable, the first time derivative of the error variable, the first controller parameter and/or the second controller parameter.

According to an embodiment, the pre-controller is configured for determining the reference duty ratio in at least three sub-periods of time of the predetermined period of time. In other words, the predetermined period of time may be split into at least three sub-periods, and the reference duty ratio over the predetermined period of time may be determined and/or computed in each of these sub-periods separately and/or independently. Thus, an actual planning algorithm for the determination and/or computation of the desired reference duty ratio, which may be embedded in the pre-controller, may be split into several sub-periods. This may allow to provide a robust, stable and at the same time flexible planning algorithm for determining the reference duty ratio.

According to an example, the pre-controller may be configured to determine the reference duty ratio, the reference inductor current and/or the reference output voltage of the resonant converter in a plurality of sub-periods of time of the predetermined period of time, e.g. in at least two sub-periods of time. Therein, the reference duty ratio, the reference inductor current and/or the reference output voltage may each have a different course in at least a part of and/or some of the sub-periods of time of the predetermined period of time.

According to an embodiment, in a first sub-period of time a reference inductor current of the resonant converter is increased to a nominal current value, in a second sub-period of time the reference inductor current is kept constant at the nominal current value, and in a third sub-period of time the reference inductor current is decreased to a steady state current value of the resonant converter, such as e.g. a resonant inductor current value. Based on the course of the reference inductor current, the reference output voltage and/or the reference duty ratio may be determined and/or calculated by the pre-controller in the at least three sub-periods. Therein, during the first sub-period of time the reference inductor current may be ramped up to the desired nominal current value along a sufficiently smooth trajectory, such as e.g. a polynomial for the reference inductor current as a function of time. The corresponding reference output voltage increase in the first sub-period of time may then be determined based on the mathematical model and the reference inductor current in the first sub-period of time. Further, during the second sub-period of time the reference inductor current may be kept constant at the desired nominal current value, wherein the corresponding reference output voltage increase during the second sub-period of time may also be determined based on the mathematical model and the reference inductor current in the second sub-period of time. Moreover, during the third sub-period of time the reference inductor current may be decreased to a steady state value of the resonant converter, such as e.g. a resonant inductor current, by a sufficiently smooth trajectory. Again, the reference output voltage may keep smoothly increasing to its desired nominal value and/or set-point value and this trajectory and/or course of the reference output voltage value may be immediately determined based on the mathematical model and the reference inductor current in the third sub-period of time.

According to an embodiment, the modulator is configured for determining the switching signal based on a pulse width modulation, based on a pulse frequency modulation and/or based on a delta-sigma modulation. This may allow to quickly and reliably convert the continuous control signal into the discrete switching signal, which may then be used to actuate the inverter and/or e.g. to drive the semiconductor switches of the inverter.

According to a second aspect of the invention, an X-ray imaging apparatus is provided. The X-ray imaging apparatus comprises an X-ray source arrangement for generating X-ray radiation, as described above and in the following, and an X-ray detector for detecting X-ray radiation generated by the X-ray source arrangement.

It should be noted that features, functions, elements and/or characteristics of the X-ray source arrangement, as described above and in the following, may be features, functions, elements and/or characteristics of the X-ray imaging apparatus, as described above and in the following. Vice versa, features, functions, elements and/or characteristics of the X-ray imaging apparatus, as described above and in the following, may be features, functions, elements and/or characteristics of the X-ray source arrangement, as described above and in the following.

According to a third aspect of the invention, a method for operating an X-ray source arrangement for generating X-ray radiation is provided. The X-ray source arrangement comprises an X-ray tube and a converter arrangement with an inverter and a resonant converter for providing a source voltage to the X-ray tube. The method comprises the steps of:
  determining, e.g. by means of a pre-controller of the X-ray source arrangement, a reference duty ratio of the resonant converter over a predetermined period of time based on a mathematical model of the resonant converter;
  determining, e.g. by means of the pre-controller, a control signal, particularly a digital control signal, correlating with the reference duty ratio over the predetermined period of time;
  determining, e.g. by means of a modulator of the X-ray source arrangement, a switching signal, particularly a discrete switching signal, based on the control signal and/or converting the control signal into the switching signal; and
  actuating the inverter of the converter arrangement by providing and/or supplying the switching signal to the inverter, such that the source voltage is generated by the converter arrangement.

Further, the generated source voltage may be provided and/or supplied to the X-ray tube to generate X-ray radiation.

It should be noted that features, functions, elements and/or characteristics of the X-ray source arrangement as well as of the X-ray imaging apparatus, as described above and in the following, may be features, functions, elements, characteristics and/or steps of method for operating the X-ray source arrangement, as described above and in the following. Vice versa, features, functions, elements, characteristics and/or steps of the method for operating the X-ray source arrangement, as described above and in the following, may be features, functions, elements and/or characteristics of the X-ray source arrangement and/or of the X-ray imaging apparatus, as described above and in the following. In other words, any feature described with reference to one aspect of the invention may be a feature of any other aspect of the invention.

According to an embodiment, the method for operating the X-ray source arrangement further comprises the step of determining a reference inductor current of the resonant converter over the predetermined period of time based on the mathematical model of the resonant converter. Alternatively or additionally, the method for operating the X-ray source arrangement further comprises the step of determining a reference output voltage of the converter arrangement over the predetermined period of time based on the mathematical model of the resonant converter.

According to an embodiment, the method for operating the X-ray source arrangement further comprises the steps of:
measuring a value of the source voltage;
comparing the measured value of the source voltage to a reference output voltage value, e.g. by subtracting the measured source voltage value from the reference output voltage value;
generating a feedback control signal indicative of a deviation of the measured value of the source voltage from the reference output voltage value;
adding the feedback control signal to the control signal determined by the pre-controller; and
determining the switching signal based on the added feedback control signal and the control signal.

It should be noted that a further aspect of the invention may relate to a computer program element, which when executed on a controller arrangement of the X-ray source arrangement, instructs the controller arrangement to carry out at least a part of the steps of the method for operating the X-ray source arrangement, as described above and in the following. Therein, the controller arrangement may comprise the pre-controller and/or the controller, as described above and in the following. Particularly, the computer program element may instruct the controller arrangement to carry out the steps of determining a reference duty ratio of the resonant converter over a predetermined period of time based on a mathematical model of the resonant converter and determining a control signal correlating with the reference duty ratio over the predetermined period of time.

Yet a further aspect of the invention may relate to a computer-readable medium, on which a computer program element, as described above and in the following, is stored.

These and other aspects of the invention will be apparent from and elucidated with reference to the embodiments described hereinafter.

BRIEF DESCRIPTION OF THE DRAWINGS

The subject matter of the invention will be explained in more detail in the following with reference to the exemplary embodiments which are illustrated in the attached figures, wherein.

In principle, identical or similar parts and/or elements are provided with same reference symbols in the figures.

DETAILED DESCRIPTION OF EMBODIMENTS

Figure 1:
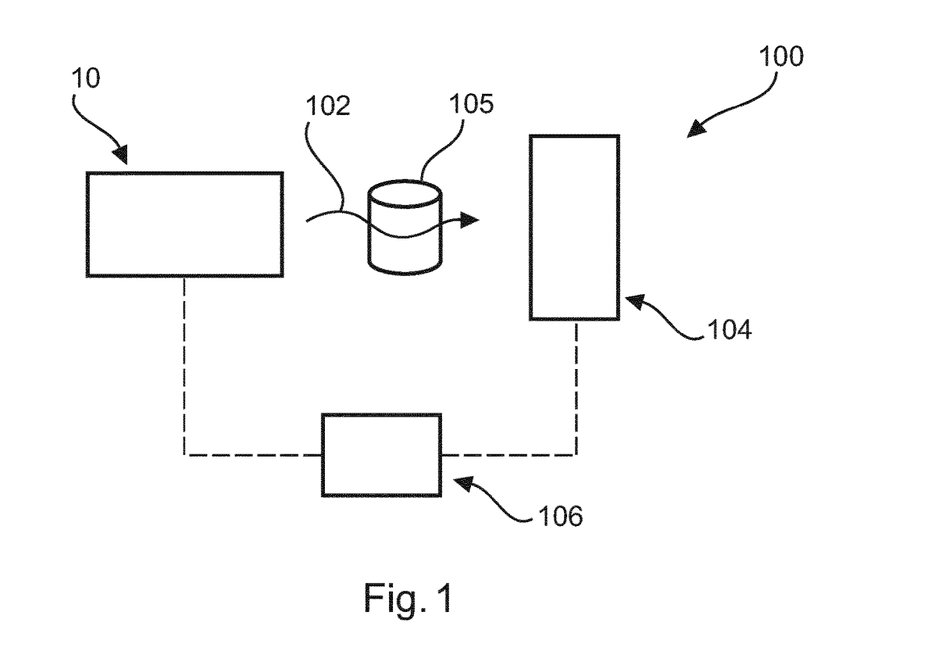
FIG. 1 shows schematically an X-ray imaging apparatus according to an exemplary embodiment.

FIG. 1 shows schematically an X-ray imaging apparatus 100 according to an exemplary embodiment.

The X-ray imaging apparatus 100 comprises an X-ray source arrangement 10 for generating and/or emitting X-ray radiation 102 and an X-ray detector 104 for detecting at least a part of the X-ray radiation 102 emitted by the X-ray source arrangement 10. The X-ray detector 104 may be arranged and/or configured for detecting X-ray radiation 102 passing through an object 105 to be irradiated. Elements, features and/or functions of the X-ray source arrangement 10 will be explained in more detail with reference to following figures.

Further, the X-ray imaging apparatus 100 comprises a control device 106 for controlling the X-ray source arrangement 10 and/or the X-ray detector 104.

Generally, the X-ray imaging apparatus 100 may be any kind of X-ray imaging apparatus, such as e.g. a C-arm system, a computed tomography (CT) imaging apparatus, a cone beam imaging apparatus and/or a cone beam CT imaging apparatus.

Figure 2:
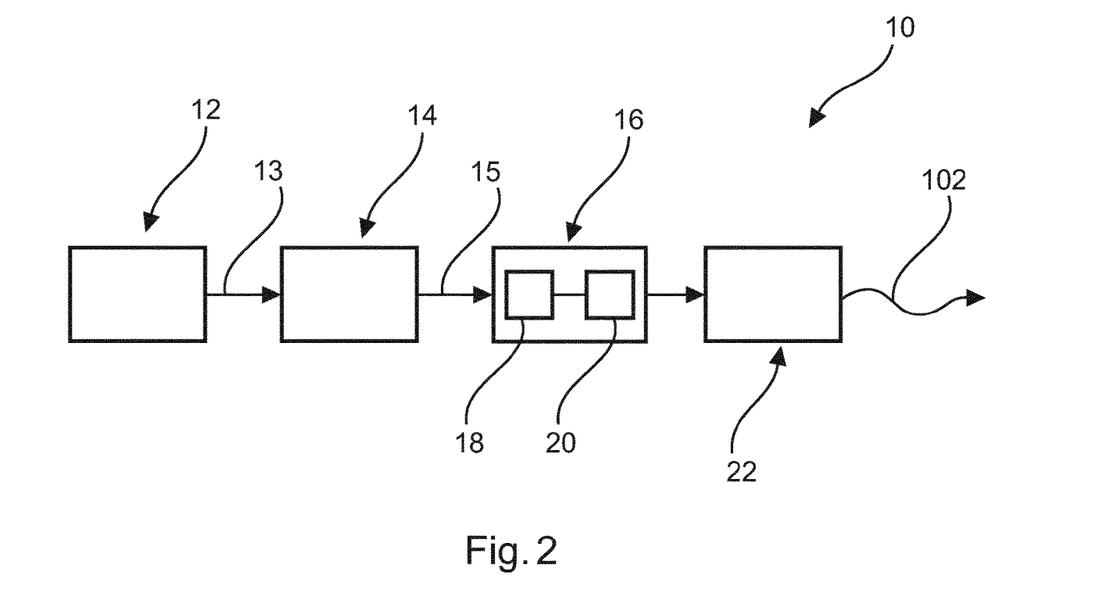
FIG. 2 shows schematically an X-ray source arrangement according to an exemplary embodiment.
Figure 3:
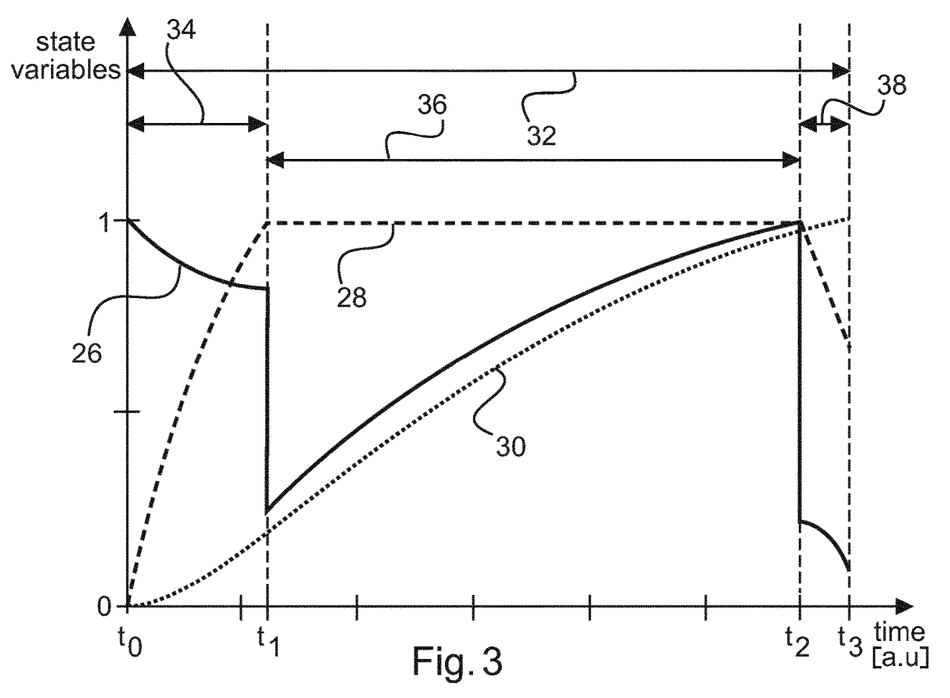
FIG. 3 illustrates system variables of the X-ray source arrangement as determined by the X-ray source arrangement of FIG. 2.

FIG. 2 shows schematically an X-ray source arrangement 10 according to an exemplary embodiment. The X-ray source arrangement 10 of FIG. 2 may e.g. be employed in the X-ray imaging apparatus 100 shown in FIG. 1. FIG. 3 shows system variables 26, 28, 30 of the X-ray source arrangement 10 as a function of time t, respectively, as determined by the X-ray source arrangement 10 of FIG. 2, wherein the y-axis refers to values of the system variables 26, 28, 30 and the x-axis refers to the time t in arbitrary units. More specifically, the solid line 26 in FIG. 3 shows a trajectory of a reference duty ratio 26 as a function of time t, the dashed line 28 shows a trajectory of a reference inductor current 28 as a function of time t, and the dotted line 30 shows a trajectory of a reference output voltage 30 as a function of time t. The reference duty ratio 26 may range from zero to one as shown in FIG. 3. Further, for illustration purposes, the reference inductor current 28 and the reference output voltage 30 shown in FIG. 3 are each normalized to their respective maximum value.

The X-ray source arrangement 10 comprises a pre-controller 12, a modulator 14, a converter arrangement 16 with an inverter 18 and a resonant converter 20, and an X-ray tube 22 for generating and/or emitting X-ray radiation 102. The X-ray tube 22 may be any kind of X-ray tube 22, such as e.g. a single focal spot X-ray tube, a dual focal spot X-ray tube, and/or a stereo X-ray tube.

As shown in FIG. 2, the pre-controller 12 and/or an output of the pre-controller 12 is coupled and/or connected to the modulator 14 and/or to an input of the modulator 14. Further, the modulator 14 and/or an output of the modulator is coupled and/or connected to the converter arrangement 16 and/or to the inverter 18 of the converter arrangement 16. The inverter 18 is connected and/or coupled to the resonant converter 20. Moreover, the converter arrangement 16 and/or the resonant converter 20 is coupled and/or connected to the X-ray tube 22.

The pre-controller 12 is configured for determining, computing and/or calculating the trajectories of the system variables 26, 28, 30 as exemplary shown in FIG. 3 based on a mathematical model of the resonant converter 20, which will be explained in more detail with reference to FIG. 4. Particularly, the pre-controller 12 is configured for determining the reference duty ratio 26 over a predetermined period of time 32, ranging from $t_0$ to $t_3$ in FIG. 3, based on the mathematical model. Further, the pre-controller 12 is configured for determining the reference inductor current 28 and the reference output voltage 30 over the predetermined period of time 32, respectively, based on the mathematical model of the resonant converter 20, wherein the reference duty ratio 26 may then be determined by the pre-controller 12 based on the reference inductor current 28 and the reference output voltage 30.

The pre-controller 12 may determine the reference duty ratio 26, the reference inductor current 28 and/or the reference output voltage 30 over the entire predetermined period of time 32. However, the pre-controller 12 may also be configured for determining the reference duty ratio 26, the reference inductor current 28 and/or the reference output voltage 30 in various sub-periods of time 34, 36, 38, particularly in at least three sub-periods of time 34, 36, 38. Referring to FIG. 3, a first sub-period time 34 may range from $t_0$ to $t_1$, a second sub-period of time 36 may range from $t_1$ to $t_2$, and a third sub-period of time 38 may range from $t_2$ to $t_3$.

By way of example, in the first sub-period of time 34 the reference inductor current 28 may be ramped up and/or increased to a nominal current value, which may be a maximum current value, by a sufficiently smooth and/or continuously differentiable function, such as e.g. a polynomial function. Based on the mathematical model of the resonant converter 20, the corresponding reference output voltage 30 and/or the reference duty ratio 26 in the first sub-period of time 34 may then be calculated and/or determined.

In the second sub-period of time 36 the reference inductor current 28 may be kept constant at the nominal current value, and the corresponding reference output voltage 30 and/or the reference duty ratio 26 in the second sub-period of time 36 may then be calculated and/or determined based on the mathematical model of the resonant converter 20.

In a third sub-period of time 38 the reference inductor current 28 may be decreased to a steady state current value of the resonant converter 20, such as e.g. a resonant inductor current value. Also in the third sub-period of time 38, the reference inductor current 28 may be described by sufficiently smooth and/or continuously differentiable function. Based on the mathematical model of the resonant converter 20, the corresponding reference output voltage 30 and/or the reference duty ratio 26 in the third sub-period of time 38 may then be calculated and/or determined.

The reference duty ratio 26, the reference inductor current 28 and/or the reference output voltage 30 may be determined in the first, second and third sub-period of time 34, 36, 38 in consecutive order. In other words, a straight forward planning algorithm employed in the pre-controller 12 may be sufficient in various situations. However, there may also be situations where some sort of reverse planning may be appropriate. Accordingly, the reference duty ratio 26, the reference inductor current 28 and/or the reference output voltage 30 may be determined in arbitrary sequence in the first, second and third sub-period of time 34, 36, 38. By way of example, the reference duty ratio 26, the reference inductor current 28 and/or the reference output voltage 30 may be determined in the third sub-period of time 38 before the second sub-period of time 36 in order to determine when the second sub-period of time 32 is to be terminated, i.e. in order to determine time $t_2$.

Generally, by determining the reference duty ratio 26, the reference inductor current 28 and/or the reference output voltage 30 over the predetermined period of time 32, which may optionally be split into the at least three sub-periods of time 34, 36, 38, the pre-controller 12 and/or a planning algorithm employed therein may look ahead in time. Therein, a time horizon may comprise several natural resonance time periods of the resonant converter 20.

Further, it is to be noted that the pre-controller 12 is configured for taking any hardware limits of the X-ray source arrangement 10 into account by determining the reference duty ratio 26, the reference inductor current 28 and/or the reference output voltage 30 over the predetermined period of time 32 based on the mathematical model of the resonant converter 20. This results in the reference duty ratio 26 falling within the interval between zero and one. Further, the reference inductor current 28 may never exceed a desired maximum current value, which may e.g. be in the order of several hundreds of Ampere, e.g. about 300 A. Moreover, any actuator limits may also be considered, which again results in the duty ratio 26 falling within the interval zero and one. It is further to be noticed, that these actuator and/or hardware limits are respected by the trajectory planning algorithm employed in the pre-controller 12. In other words, no hardware protection means may be required for enforcing these limits.

Further, the pre-controller 12 is configured for determining a control signal 13 correlating with and/or indicative of the determined reference duty ratio 26 over the predetermined period of time 32. The control signal 13 may refer to a digital and/or continuous control signal 13. Moreover, the pre-controller 12 is configured for providing and/or supplying the control signal 13 to the modulator 14.

The modulator 14 is configured for determining and/or deriving a switching signal 15 based on the control signal 13. The switching signal 15 may refer to a discrete switching signal 15 and may be provided and/or supplied to the inverter 18 to actuate the inverter 18. More specifically, the inverter 18 may comprise at least one half-bridge module and/or full-bridge module with at least one semiconductor switch, and the modulator 14 may be configured for supplying the switching signal 15 to a gate terminal of the at least semiconductor switch in order to actuate the inverter 18. For the determination of the switching signal 15, the modulator 14 may be configured for applying any modulation technique, such as e.g. pulse width modulation, pulse frequency modulation and/or delta-sigma modulation, allowing to convert the continuous control signal 13 into the discrete switching signal 15.

By actuating the converter arrangement 16 and/or the inverter 18 in accordance with the switching signal 15, a desired source voltage and/or source voltage pulse may finally be generated by the converter arrangement 16. The generated source voltage and/or source voltage pulse may then be supplied to the X-ray tube 22 to generate an X-ray radiation 102 and/or a pulse of X-ray radiation 102.

Figure 4:
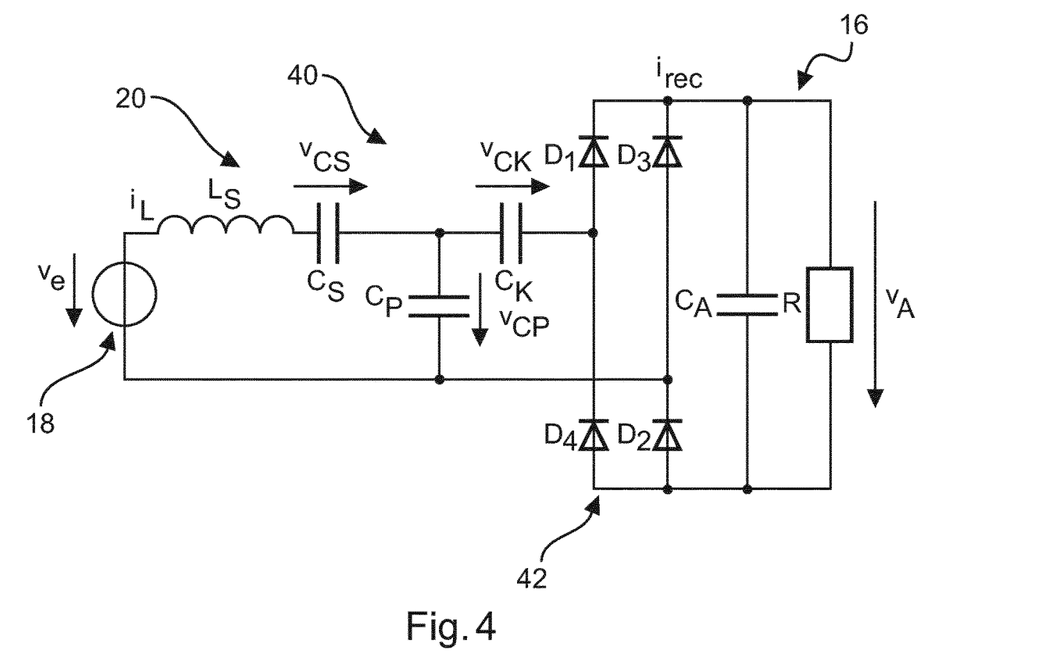
FIG. 4 shows schematically a converter arrangement of an X-ray source arrangement according to an exemplary embodiment.

FIG. 4 shows schematically a converter arrangement 16 of an X-ray source arrangement 10 according to an exemplary embodiment. More specifically, FIG. 4 shows a circuit of the converter arrangement 16. If not stated otherwise, the converter arrangement 16 of FIG. 4 comprises the same features, functions and/or elements as the converter arrangement 16 described with reference to previous FIGS. 1 to 3.

The converter arrangement 16 comprises an inverter 18 for supplying electrical power to a resonant converter 20 of the converter arrangement 16, particularly for supplying an input voltage $v_e$ to the resonant converter 20. The input voltage $v_e$ may be generated by at least one half-bridge module and/or full-bridge module of the inverter 18 by converting a three-phase current into a DC current. Therein the at least one half-bridge module and/or full-bridge module may work at a DC-bus with a voltage $V_{DC}$. Thus, the output voltage $v_e$ may take the values $-V_{DC}$, 0 or $+V_{DC}$.

The resonant converter 20 of the converter arrangement 16 comprises a series-parallel resonant converter 40, also referred to as LCC circuit, comprising an inductor coil Ls, a capacitor $C_S$ connected in series to the inductive coil Ls, and a capacitor Cp.

The resonant converter 20 further comprises a voltage doubler in the form of a boost capacitor $C_K$ and a diode rectifier 42 with four diodes $D_1$, $D_2$, $D_3$ and $D_4$. Therein, the boost capacitor $C_K$ is arranged between the series-parallel resonant converter 40 and the diode rectifier 42. The boost capacitor $C_K$ may refer to and/or be part of a voltage multiplier of the converter arrangement 16. Thus, the boost capacitor $C_K$ may refer to and/or represent any voltage multiplication circuitry of the converter arrangement 16.

Moreover, the resonant converter 40 comprises a capacitor $C_A$ serving as capacitive output filter, which is arranged between the diode rectifier 42 and a load R. The load R may refer to a resistance R illustrating and/or modelling the X-ray tube 22, which may be driven by the converter arrangement 16 as shown e.g. in FIG. 2. By way of example, the X-ray tube 22 is modeled as resistance R in FIG. 4. However, any other modeling approach may be used. For instance, the X-ray tube 22 may be modeled as a current sink and/or a power sink.

Accordingly, the resonant converter 20 comprises in total five energy storage elements for storing electrical energy. These five energy storage elements are the inductor coil Ls and the capacitors $C_S$, $C_P$, $C_K$ and $C_A$. All these energy storage elements are contained and/or taken into account in the mathematical model of the resonant converter 20, as explained in more detail in the following.

The converter arrangement 16 may be operated in quantum operation mode, in which the inverter 18 is actuated at, near and/or close to a zero crossing of an inductor current $i_L$ flowing in the resonant converter 20. In other words, the full-bridge module and/or the half-bridge module of the inverter 18 may be switched close to and/or near the zero crossings of the inductor current $i_L$. The term "near the zero crossings of the inductor current" may include switching the inverter 18 exactly at the zero crossings and/or switching the inverter 18 with a certain fixed phase shift ahead of the zero crossings of the inductor current $i_L$ and/or switching the inverter 18 with an adjustable and/or adaptable phase shift ahead of the zero crossing, wherein an amount of the phase shift may be derived from a variable of the converter arrangement 16.

In the following, the mathematical model of the resonant converter 20 is explained in more detail with reference to FIG. 4.

For a control of the converter arrangement 16 the input voltage $v_e$ may only be chosen to be in phase or off phase to the inductor current $i_L$ or zero voltage. It is assumed that the at least one power semiconductor and/or the at least one semiconductor switch of the inverter 18 is ideal, that a source voltage $v_A$ and/or an output voltage $v_A$ of the converter arrangement 16 is varying slowly in time, that a voltage $V_{DC}$ for driving the inverter 18 is constant, and that ideal switching occurs at the zero crossings of the inductor current $i_L$. As already outlined above, the source voltage $v_A$ may denote a voltage supplied via the converter arrangement 16 to the X-ray tube 22. This source voltage $v_A$ may also be an actual output voltage $v_A$ and/or the output voltage $v_A$ of the converter arrangement 16, which is referred to as the reference output voltage $v_A$ when determined and/or calculated based on the mathematical model. Moreover, the source voltage $v_A$, the output voltage $v_A$ and/or the reference output voltage $v_A$ may be the flat output of the converter arrangement 16, which may further be the voltage across capacitor $C_A$ in FIG. 4.

Further, it is to be noted that in at least some high voltage applications a transformer between capacitors $C_S$ and $C_P$ with a turns ratio $w_1/w_2$ may be used, wherein it may be assumed that the values of the capacitances $C_P$, $C_k$ and $C_A$ and the load R are calculated to equivalent values at a primary side of the transformer.

Further, the modelling of the resonant converter 20 in the mathematical model is based on a generalized averaging method. In other words, the mathematical model is an averaged mathematical model taking only slowly varying characteristics of the resonant converter 20 in to account.

In the mathematical model it is assumed, that a waveform of the current and voltages in the resonant converter 20 and the input voltage $v_e$, generated by the inverter 18, are pure sinusoidal and may be described by their fundamental harmonic at a resonance frequency $\omega_r$. In contrast, a rectifier current $i_{rec}$ and the output voltage $v_A$ may be replaced by their average values which are slowly time varying.

It is further to be noted that a modelling of fast transients with resonance frequency may be replaced by the modelling of slowly time varying amplitudes of the sine and cosine part of the fundamental harmonic. However, an important part of the modelling may be the calculation of the fundamental representation of non-sinusoidal waveforms. In the series-parallel resonant converter 40 with output voltage doubler the current in the parallel resonant capacitor $C_p$ may have a non-sinusoidal shape and may thus be replaced by its fundamental component. The fundamental component may e.g. be derived by a Fourier series calculation for one period. The mathematical model used and/or employed in the pre-controller 12 for determining the reference duty ratio 26, the reference inductor current 28 and/or the reference output voltage may then be derived by replacing the system variables in a switched model by their fundamental representations. The resulting equations may then be separated in their sine and cosine parts.

The resulting mathematical model for the resonant converter 20 may finally be given by a first and a second non-linear differential equation:

$$L_S \frac{di_L}{dt} = \frac{2}{\pi} r V_{DC} + \frac{2 v_A C_K (-i_L + v_A \omega_r C_P)}{\pi (C_P + C_K) i_L} \text{ and}$$

-continued $$C_A \frac{dv_A}{dt} = \frac{2}{1+\frac{C_P}{C_K}}\left(\frac{i_L}{\pi} - \frac{v_A \omega_r C_P}{\pi}\right) - \frac{v_A}{R},$$

wherein $i_L$ denotes the reference inductor current, $V_A$ denotes the reference output voltage, and r denotes the reference duty ratio. It is to be noted that this mathematical model may be slightly modified by a person skilled in the art if the load R, i.e. the X-ray tube 22, is modelled by a current sink and/or power sink as mentioned above. As is evident from the first and second equations of the mathematical model, if a trajectory for the reference inductor current $i_L$ is chosen over the predetermined period of time 32, e.g. as described with reference to FIG. 3 and the three sub-periods of time 34, 36, 38, the reference output voltage $V_A$ as well as the reference duty ratio r may be calculated and/or determined over the predetermined period of time 32 based on the first and second differential equations of the mathematical model.

In the following, characteristics of the mathematical model are summarized. The mathematical model comprises a first differential equation and a second differential equation describing a relation between the reference inductor current $i_L$, the output voltage $v_A$ and the reference duty ratio r. More specifically, the first differential equation is a non-linear differential equation and the second differential equation is a linear differential equation. In the first differential equation a time derivative of the inductor current $i_L$ is proportional to a sum of three terms, wherein a first terms is proportional to the reference duty ratio r, a second term is proportional to the square of the reference output voltage $v_A$ divided by the reference inductor current $i_L$, and a third term is proportional to the reference output voltage $v_A$. In the second differential equation, a time derivative of the reference output voltage $v_A$ is proportional to a sum of three terms. A first term is proportional to the inductor current $i_L$, a second term is proportional to the reference output voltage $v_A$, and a third term is also proportional to the reference output voltage $v_A$. More specifically, the third term is the reference output voltage $v_A$ divided by the load R.

Moreover, the mathematical model is an averaged mathematical model, wherein at least a part of the system variables of the converter arrangement 16, i.e. the reference inductor current $i_L$, the reference output voltage $v_A$ and/or the reference duty ratio r, may be averaged over at least one resonance period of the resonant converter 20, particularly over at least two and/or at least three resonance periods. Also, at least a part of the system variables may be averaged over at least five to ten resonance periods of the resonant converter 20. Therein, the term "averaging" and/or "averaged" may refer to amplitudes and/or the use of amplitudes of a Fourier series expansion of at least a part of the system variables in order to describe the slowly time varying component of the respective system variable.

Figure 5:
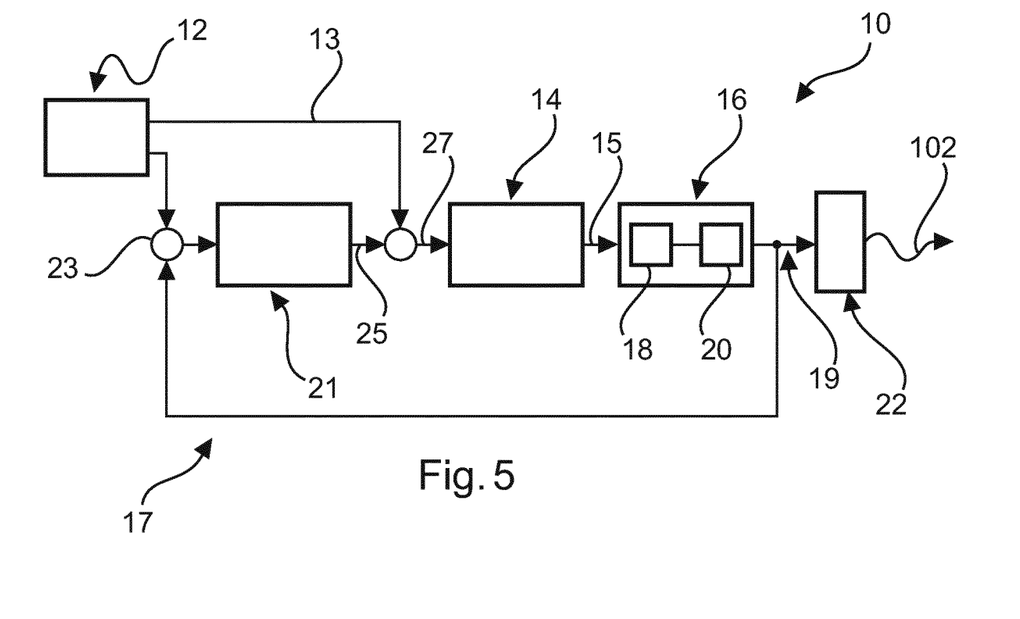
FIG. 5 shows schematically an X-ray source arrangement according to an exemplary embodiment.

FIG. 5 shows schematically an X-ray source arrangement 10 according to an exemplary embodiment. If not stated otherwise, the X-ray source arrangement 10 of FIG. 5 comprises the same features, functions and/or elements as the X-ray source arrangements 10 described with reference to previous figures.

In addition to the features and/or elements of the X-ray source arrangement 10 described in previous figures, the X-ray source arrangement 10 of FIG. 5 comprises a feedback loop 17 with a voltage measuring device 19 for measuring a value of a source voltage supplied by the converter arrangement 16 to the X-ray tube 22.

Further, the X-ray source arrangement 10 and/or the feedback loop 17 comprises a controller 21 configured for compensating deviations of the source voltage from the reference output voltage $v_A$ as determined by the pre-controller 12 based on the mathematical model of the resonant converter 20. For this purpose, the pre-controller 12 and/or a further output of the pre-controller 12 is coupled and/or connected to the controller 21. Apart from that, the controller 21 and/or an output thereof is coupled and/or connected to the modulator 14.

In order to compensate deviations of the source voltage from the reference output voltage $v_A$ the controller 21 is configured for comparing a reference output voltage value provided by the pre-controller 12 to the controller 21 with the measured value of the source voltage. This comparison may e.g. be done by subtracting the measured value of the source voltage from the reference output voltage value, as schematically indicated by the circle 23 in FIG. 5, which may refer to a comparison module 23 of the controller 21.

Moreover, the controller 21 is configured for determining a feedback control signal 25 indicative of the deviation of the measured value of the source voltage from the reference output voltage value. This feedback control signal 25 may then be added to the control signal 13 correlating with the reference duty ratio r, which is provided by the pre-controller 12, and the added signal 27 is provided and/or supplied to the modulator 14 in order to generate the switching signal 15 based on the added signal 27. This basically allows to guide the resonant converter 20 along the trajectory of the reference duty ratio 26 over the predetermined period of time 32.

Further, it is to be noted that it has been found by the inventors of the present invention that the resonant converter 20 modelled by the mathematical model, as described in detail with reference to FIG. 4, is a flat dynamical system. Accordingly, any function applied to the reference output voltage $v_A$ is a flat output of the resonant converter 20. This allows to linearize the resonant converter 20 by feeding forward the control signal 13 correlating with the reference duty ratio r, 26 over the predetermined period of time 32 to the modulator 14.

As a consequence, the controller 21 may be a linear controller 21 and the feedback control signal 25 may be determined based on solving an ordinary linear differential equation of first order with constant coefficients. In other words, by linearizing the resonant converter 20 by means of the control signal 13 correlating with the reference duty ratio 26 over the predetermined period of time 32, the non-linear system of equations of the mathematical model obeys a well-defined linear error dynamics in the form of the following differential equation:

$$c_1 \dot{e} + c_0 e,$$

wherein e denotes the deviation of the measured value of the source voltage from the reference output voltage value. These terms may be determined by the controller 21 during operation of the X-ray source arrangement 10 in order to guide the converter arrangement 16 along the trajectory of the reference duty ratio r, 26 over the predetermined period of time 32.

Figure 6:
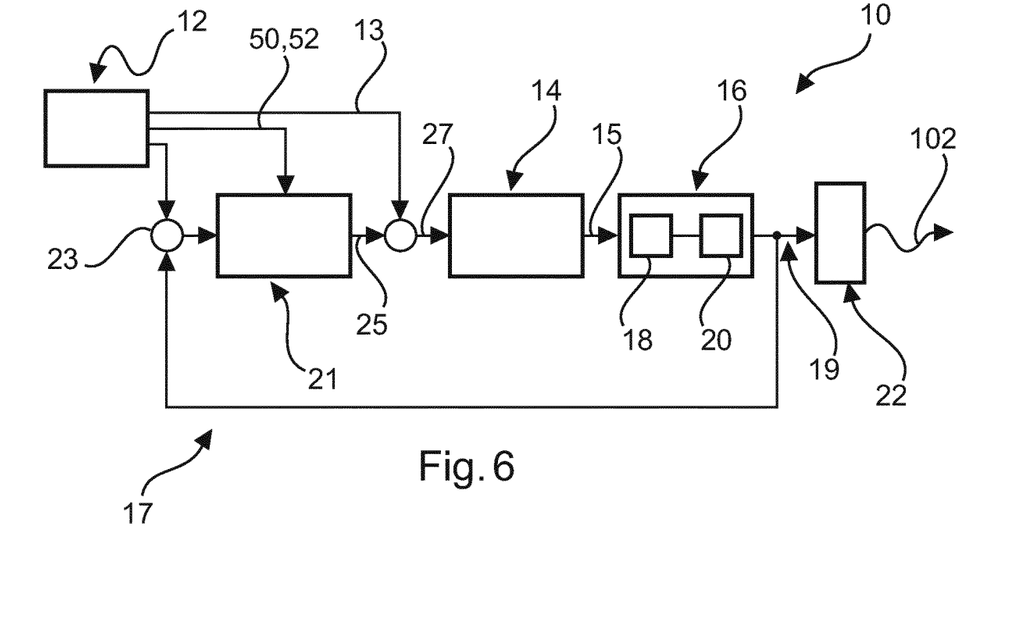
FIG. 6 shows schematically an X-ray source arrangement according to an exemplary embodiment.

More specifically, the error dynamics of the error variable and/or the error signal e may be governed by a second order ordinary linear homogenous differential equation of the form $$\ddot{e} + c_d \dot{e} + c_p e = 0,$$

wherein e denotes the error variable, ė denotes the first time derivative of the error variable and ë denotes the second time derivative of the error variable. The controller 21 may then determine the derivative part $C_d\dot{e}$ and the proportional part $c_p e$ of this second order differential equation. These two parts may accordingly refer to a first order linear differential equation, from which the feedback control signal 25 may be synthesized and/or determined by the controller 21. Therein, the coefficient $c_d$ of the derivative part and the coefficient $c_p$ of the proportional part can be determined and/or provided by the pre-controller 12, e.g. in the form of a first controller parameter 50 and a second controller parameter 52 as described with reference to FIG. 6.

As already stated above, this allows that the controller 21 may be a linear controller 21 having a proportional part and/or term as well as a derivative part and/or term, wherein the derivative part may be dominating. In principle, this may suffice to achieve the control objective, i.e. to guide the resonant converter 20 along the reference duty ratio r, 26. However, the linear controller 21 shown in FIG. 5 may also have a minor integral term, wherein this minor integral term of the controller 21 is not to be confused with the integral action of a controller employed in conventional X-ray source arrangements. The minor integral term of the controller 21 according to the invention may compensate small discrepancies between the mathematical model and the real resonant converter 20. These discrepancies may be unavoidable as the mathematical model may neglect certain aspects of the real resonant converter 20 and is based on averaging to focus on the long-term behavior. However, such a mathematical averaged model may facilitate an efficient trajectory planning algorithm that exploits the flatness property of the resonant converter 20.

In the following, various aspects of the invention are briefly summarized. The invention is based on the determination and the implementation of appropriate trajectories for the reference duty ratio 26, the reference inductor current 28 and/or the reference output voltage 30 over the predetermined period of time 32. An averaged mathematical model is applied that may capture only the slowly varying characteristics of the resonant converter 20. This mathematical model is used to determine the reference duty ratio 26, the reference inductor current 28 and/or the reference output voltage 30 over the predetermined period of time 32. Further, a reference output voltage value is compared with a measured value of the source voltage, and an error signal resulting from this comparison is fed to the controller 21. Moreover, the reference duty ratio r, 26 is then added to feedback control signal 25 of the controller 21 and fed forward to the modulator 14. The fed forward reference duty ratio 26 achieves the linearization of the resonant converter 20 and allows for the linear controller design, i.e. it allows to use a linear controller 21. As mentioned above, the modulator 14 translates the continuous added signal 27, i.e. the added control signal 13 and the feedback control signal 25, into the switching signal 15. The discrete switching signal 15 is then used to derive the appropriate gate signals for the semiconductor switches of the inverter 18 which may be the input stage of the resonant converter 20.

FIG. 6 shows schematically an X-ray source arrangement 10 according to an exemplary embodiment. If not stated otherwise, the X-ray source arrangement 10 of FIG. 6 comprises the same features, functions and/or elements as the X-ray source arrangements 10 described with reference to previous figures.

As described in previous figures, the reference duty ratio r may be determined by the pre-controller 12, e.g. via the system's flat output and/or e.g. without numerical integration. The reference duty ratio r and/or the trajectory of the reference duty ratio r may be fed forward in the form of the control signal 13. This may achieve a linearization of the converter arrangement 16 and/or the X-ray source arrangement 10. In the case of a series-parallel resonant converter, the linearization may lead to an error signal and/or an error variable e, which may be the difference between the reference output voltage value and a measured value of the source voltage, that is governed by a second order ordinary linear homogenous differential equation with constant coefficients, as described with reference to FIG. 5. In other words, although the resonant converter 20 and/or the converter arrangement 16 is a non-linear system its error dynamics is governed by a linear differential equation.

The controller 21 shown in FIG. 6 determines and/or contributes the first time derivative of the error variable ė and the error variable e itself of the second order differential equation that determines the error dynamics. The two coefficients $c_d$ and $c_p$ may be constant coefficients, for a specific reference duty ratio r determined over the predetermined period of time, of the second order ordinary linear homogenous differential equation and/or they may be associated with the proportional and derivative part of the controller 21. Therein the coefficient $c_d$ of the derivative part relates to and/or correlates with a first controller parameter 50 of the controller 21 and the coefficient $c_p$ of the proportional part relates to and/or correlates with a second controller parameter 52 of the controller 21.

Further, the pre-controller 12 is configured to determine, compute and/or calculate the first controller parameter 50 and/or the second controller parameter 52. Likewise, the pre-controller 12 may be configured to determine one of or both coefficients $c_d$ and $c_p$. These two coefficients and/or the first and second controller parameters 50, 52 may be derived by the pre-controller 12 based on the mathematical model of the resonant converter 20.

Particularly, the first and second controller parameters 50, 52 may be derived from a transition time, e.g. a pre-computed transition time, between a first state of the converter arrangement 16, in which a first reference output voltage is generated by the converter arrangement 16, and a second state of the converter arrangement 16, in which a second reference output voltage is generated by the converter arrangement 16. The transition time may refer to the predetermined period of time, over which the reference duty ratio r is determined. The first state and the second state may refer to equilibrium points or states. The pre-controller 12 may determine the first and the second controller parameter 50, 52 in such a way that eigenvalues of the second order ordinary linear homogenous differential equation, as described with reference to FIG. 5, assume certain and/or specific values. The eigenvalues then determine the dynamics of the second order linear differential equation. Accordingly, by choosing appropriate coefficients $c_d$, $c_p$ and/or by choosing appropriate controller parameters 50, 52 the error dynamics of the converter arrangement 16 can be directly influenced in a way that may be considered appropriate for achieving a specific control objective, such as changing the source voltage from an initial value in the first state to a final value in the second state.

Accordingly, a design of the controller parameters 50, 52 may become a transparent, automatic, and repeatable process that follows immediately after the trajectory planning process, i.e. after determining the reference duty ration r over the predetermined period of time, has been finished. In other words, each trajectory planning and/or each determination of the reference duty ratio r over the predetermined period of time may be associated with a desired transition between the first state and the second state having its unique controller parameters 50, 52 that stabilize the system along the pre-computed trajectory.

Summarizing, the pre-controller 12 determines at least one of or both of the first controller parameter 50 and the second controller parameter 52. The pre-controller 12 may provide, output and/or feed forward the determined first and/or second controller parameter 50, 52 to the controller 21. The controller 21 in turn determines the error variable e and the first time derivative of the error variable ė. The controller 21 is further configured to determine and/or synthesize the feedback control signal 25 that is provided to the modulator 14 based on the error variable e, the first time derivative of the error variable ė, the first controller parameter 50 and/or the second controller parameter 52. This allows the X-ray source arrangement 10 and/or the converter arrangement 16 to be precisely guided along the reference duty ratio r determined over the predetermined period of time.

Figure 7:
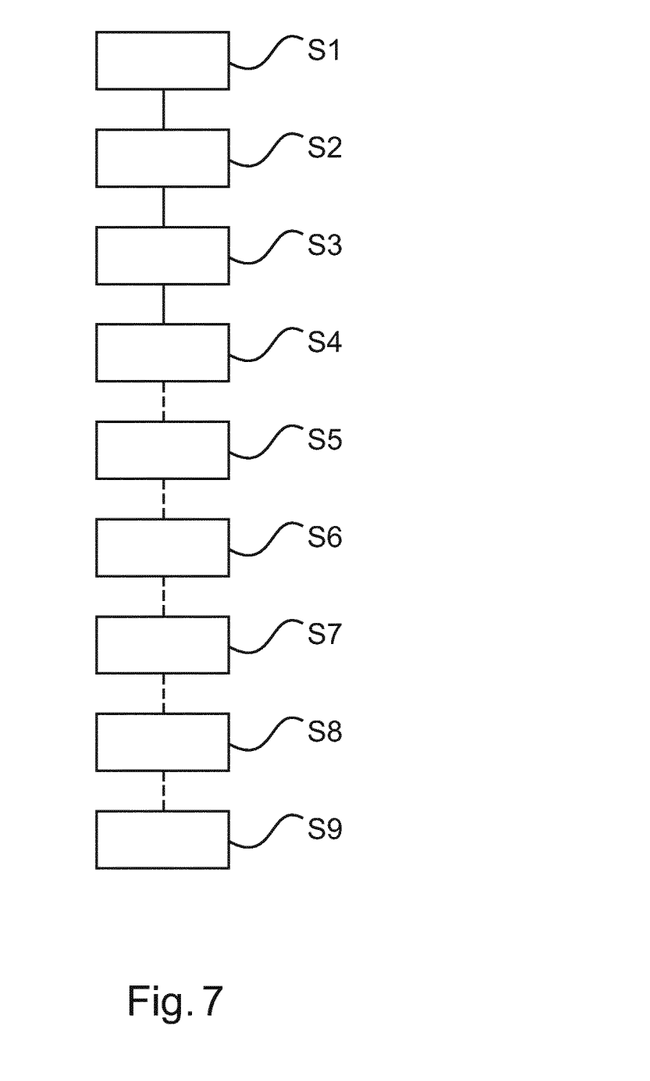
FIG. 7 shows a flow-chart illustrating steps of a method for operating an X-ray source arrangement according to an exemplary embodiment.

FIG. 7 shows a flow-chart illustrating steps of a method for operating an X-ray source arrangement 10 according to an exemplary embodiment. The X-ray source arrangement 10 comprises an X-ray tube 22 and a converter arrangement 16 with an inverter 18 and a resonant converter 20 for providing a source voltage to the X-ray tube 22. However, the X-ray source arrangement 10 may also comprise any further features and/or elements as described with reference to previous figures.

In a first step S1 a reference duty ratio 26 of the resonant converter 20 over a predetermined period of time 32 is determined based on a mathematical model of the resonant converter 20. Additionally, a reference inductor current 28 of the resonant converter 20 over the predetermined period of time 32 and/or a reference output voltage 30 of the converter arrangement 16 over the predetermined period of time 32 may be determined in step S1 based on the mathematical model of the resonant converter 20.

In a step S2 a control signal 13 correlating with the reference duty ratio 26 over the predetermined period of time 32 is determined.

In a step S3 a switching signal 15 is determined based on the control signal 13, e.g. by converting the control signal 13 into the switching signal 15 by means of a modulator 14 of the X-ray source arrangement 10.

In a step S4, the inverter 18 of the converter arrangement 16 is actuated by providing the switching signal 15 to the inverter 18, such that the source voltage is generated by the converter arrangement 16, which may be supplied to the X-ray tube 22 to generate X-ray radiation 102.

In an optional step S5 a value of the source voltage may be measured, e.g. by means of a voltage measuring device 19 of the X-ray source arrangement 10.

In a further optional step S6, the measured value of the source voltage may be compared to a reference output voltage value by a controller 21 of the X-ray source arrangement 10.

In a further optional step S7 a feedback control signal 25 indicative of a deviation of the measured value of the source voltage from the reference output voltage value may be determined by the controller 21.

In a further optional step S8 the feedback control signal 25 may be added to the control signal 13 determined by the pre-controller 21.

In a further optional step S9, the switching signal 15 may be determined based on the added feedback control signal 25 and the control signal 13.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An X-ray source arrangement for generating X-ray radiation, comprising:
   an X-ray tube;
   a converter arrangement comprising an inverter and a resonant converter configured to provide a source voltage to the X-ray tube;
   a pre-controller configured to determine a reference duty ratio of the resonant converter as continuous function of time over a predetermined period of time based on a mathematical model of the resonant converter, the pre-controller being further configured to provide a control signal correlating with the reference duty ratio; and
   a modulator coupled to the converter arrangement and the pre-controller and configured to determine a switching signal based on the control signal and provide the switching signal to the inverter for actuating the inverter, such that the source voltage is generated by the converter arrangement;
   wherein the pre-controller is further configured to feed foward, to the modulator, the control signal correlating with the reference duty ratio.

2. The X-ray source arrangement according to claim 1, wherein the pre-controller is configured to determine at least one of a reference inductor current and reference output voltage over the predetermined period of time based on the mathematical model of the resonant converter.

3. The X-ray source arrangement according to claim 2, wherein the pre-controller is configured to determine the reference duty ratio over the predetermined period of time based on at least one of the reference inductor current and the reference output voltage.

4. The X-ray source arrangement according to claim 1, wherein the resonant converter comprises a series-parallel resonant converter; and/or wherein the mathematical model of the resonant converter comprises one inductor coil and four capacitors as energy storage elements of the resonant converter.

5. The X-ray source arrangement according to claim 1, further comprising:
   a controller for compensating deviations of the source voltage from a reference output voltage of the converter arrangement;
   wherein the pre-controller is coupled to the controller and configured to provide a reference output voltage value to the controller;

wherein the controller is configured to compare the reference output voltage value to a measured value of the source voltage; and wherein the controller is configured to determine a feedback control signal indicative of a deviation of the measured value of the source voltage from the reference output voltage value.

6. The X-ray source arrangement according to claim 5, wherein the controller is a linear controller; and/or wherein the controller is configured to determine the feedback control signal based on solving an ordinary linear differential equation of first order.

7. The X-ray source arrangement according to claim 5, wherein the controller is coupled to the modulator and configured to provide the feedback control signal to the modulator; and/or wherein the modulator is configured to determine the switching signal based on the control signal of the pre-controller and based on the feedback control signal of the controller.

8. The X-ray source arrangement according to claim 1, wherein the pre-controller is configured to determine the reference duty ratio in at least three sub-periods of time of the predetermined period of time.

9. The X-ray source arrangement according to claim 8, wherein in a first sub-period of time a reference inductor current of the resonant converter is increased to a nominal current value; wherein in a second sub-period of time the reference inductor current is kept constant at the nominal current value; and wherein in a third sub-period of time the reference inductor current is decreased to a steady state current value of the resonant converter.

10. An X-ray imaging apparatus, comprising:
   an X-ray source arrangement according to claim 1 for generating X-ray radiation; and
   an X-ray detector configured to detect the X-ray radiation generated by the X-ray source arrangement.

11. An X-ray source for generating X-ray radiation, comprising:
   an X-ray Tube;
   a converter comprising an inverter and a resonant converter configured to provide a source voltage to the X-ray tube;
   a pre-controller configured to determine a reference duty ratio of the reonant converter as continuous function of time over a predetermined period of time based on a mathematical model of the resonant converter, the pre-controller being further configured to provide a control signal correlating with the reference duty ratio; and
   a modulator coupled to the converter and the pre-controller and configured to determine a switching signal based on the control signal and provide the switching signal to the inverter for actuating the inverter, such that the source voltage is generated by the converter, wherein the pre-controller is configured to determine at least one of a first controller parameter and a second controller parameter based on the mathematical model of the resonant converter; and wherein the at least one of the first controller parameter and the second controller parameter correlate with a coefficient of an ordinary linear differential equation for an error variable that correlates with a difference between the source voltage and a reference output voltage value determined by the pre-controller based on the mathematical model.

12. The X-ray source according to claim 11, wherein the pre-controller is configured to determine the first controller parameter and the second controller parameter based on the mathematical model of the resonant converter.

13. The X-ray source according to claim 11, wherein the pre-controller is configured to calculate a transition time of the converter from a first state of the converter, in which a first reference output voltage is generated by the converter, and a second state of the converter, in which a second reference output voltage is generated by the converter; and wherein the pre-controller is configured to determine the at least one of the first controller parameter and the second controller parameter based on the determined transition time.

14. The X-ray source according to claim 11, wherein the pre-controller is configured to provide the at least one of the first controller parameter and the second controller parameter to a controller of the X-ray source; and wherein the controller is configured to determine a feedback control signal based on the at least one of the first controller parameter and the second controller parameter, the feedback control signal being indicative of a deviation of the source voltage from the reference output voltage value.

15. A method for operating an X-ray source for generating X-ray radiation, the X-ray source comprising an X-ray tube and a converter with an inverter and a resonant converter configured to provide a source voltage to the X-ray tube, the method comprising:
   determining a reference duty ratio of the resonant converter as a continuous function of time over a predetermined period of time based on a mathematical model of the resonant converter;
   determining, by a pre-controller of the X-ray source, a control signal correlating with the reference duty ratio over the predetermined period of time;
   feeding forward, by the pre-controller, the control signal correlating with the reference duty ratio to a modulator of the X-ray source;
   determining a switching signal based on the control signal; and
   actuating the inverter of the converter by providing the switching signal to the inverter, such that the source voltage is generated by the converter.

* * * * *